United States Patent
Williams

(10) Patent No.: US 6,397,970 B1
(45) Date of Patent: Jun. 4, 2002

(54) STEERING SYSTEM

(75) Inventor: Dan Williams, West Lafayette, IN (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/368,841

(22) Filed: Aug. 5, 1999

(51) Int. Cl.[7] .............................................. B62D 5/10
(52) U.S. Cl. ...................................... 180/429; 180/439
(58) Field of Search ....................... 280/89.11; 180/429, 180/431, 437, 439, 440, 444; 74/388 PS

(56) References Cited

U.S. PATENT DOCUMENTS

| | | | |
|---|---|---|---|
| 759,090 A | * 5/1904 | Gardner | 280/89.11 |
| 867,282 A | * 10/1907 | MacFarren | 180/414 |
| 929,605 A | * 7/1909 | Larouette | 280/89.11 |
| 1,166,288 A | * 12/1915 | Weyden | 280/89.11 |
| 2,193,898 A | 3/1940 | Carter et al. | |
| 3,075,501 A | 1/1963 | Hruska et al. | |
| 3,299,829 A | 1/1967 | Jackson et al. | |
| 3,640,184 A | 2/1972 | Kasselmann | |
| 3,709,099 A | 1/1973 | Dumeah | |
| 3,768,871 A | 10/1973 | Meyers | |
| 3,918,544 A | 11/1975 | Jablonsky et al. | |
| 4,142,448 A | * 3/1979 | Erwin | 91/372 |
| 4,418,781 A | 12/1983 | Rabe et al. | |
| 4,475,410 A | 10/1984 | Jaeger | |
| 4,784,039 A | 11/1988 | Leinen | |
| 5,803,202 A | * 9/1998 | Bohner et al. | 180/443 |
| 6,079,289 A | * 6/2000 | Gilbert et al. | 74/388 PS |

FOREIGN PATENT DOCUMENTS

| | | | |
|---|---|---|---|
| JP | 2-124369 | * 5/1990 | 280/89.11 |

* cited by examiner

Primary Examiner—Robert P. Olszewski
Assistant Examiner—Michael Cuff
(74) Attorney, Agent, or Firm—Tarolli, Sundheim, Covell, Tummino & Szabo L.L.P.

(57) ABSTRACT

An apparatus (10) for use in turning steerable vehicle wheels (12) includes a steering wheel (18) and a power steering motor (20) which is operated in response to rotation of the steering wheel. A first spring (120) is connected with the steering wheel (18) and urges the steering wheel to rotate in one direction. A second spring (124) is connected with the power steering motor (20) and urges the power steering motor to operate in a direction to urge the steering wheel (18) to turn in a direction opposite to the direction in which the first spring (120) urges the steering wheel to turn. The two springs (120, 124) cooperate to take up lash in a linkage (24) between the power steering motor (20) and the steering wheel (18).

11 Claims, 3 Drawing Sheets

STEERING SYSTEM

BACKGROUND OF THE INVENTION

The present invention relates to a new and improved steering system in which lash is taken up when the steering system is in an initial or straight-ahead condition.

A known vehicle steering system includes a steering wheel and a power steering control valve which are interconnected by a linkage assembly. Upon rotation of the steering wheel, the linkage assembly actuates the steering control valve to effect operation of a power steering motor to turn steerable vehicle wheels. When the vehicle wheels have been turned to an extent corresponding to the extent of rotation of the steering wheel, a feedback linkage connected between the power steering motor and the steering control valve is effective to operate the steering control valve to its initial or unactuated condition. When this occurs, operation of the power steering motor is interrupted.

When the vehicle is proceeding straight down a road, lash between components of the steering system may result in the steering system tending to move away from an on-center or straight-ahead condition. When this occurs, the vehicle may tend to wander, that is to turn slightly, relative to the centerline of the road. This may be disconcerting to a driver of the vehicle.

SUMMARY OF THE INVENTION

An improved apparatus for use in turning steerable vehicle wheels includes devices which take up lash between components of the apparatus. One of the devices may be connected with the steering system adjacent to the steering wheel. The other device may be connected with a power steering motor. The two devices urge components of the steering system to move in opposite directions relative to each other to take up lash between components of the steering system. The two devices which take up lash between the components of the steering system may be a first spring which is connected with the steering system at a location adjacent to a steering wheel and a second spring which is connected with a power steering motor.

BRIEF DESCRIPTION OF THE DRAWINGS

The foregoing and other features of the present invention will become more apparent to one skilled in the art to which the present invention relates upon consideration of the following description of the invention with reference to the accompanying drawings wherein.

DESCRIPTION OF ONE SPECIFIC PREFERRED EMBODIMENT OF THE INVENTION

Steering Apparatus

Figure 1:
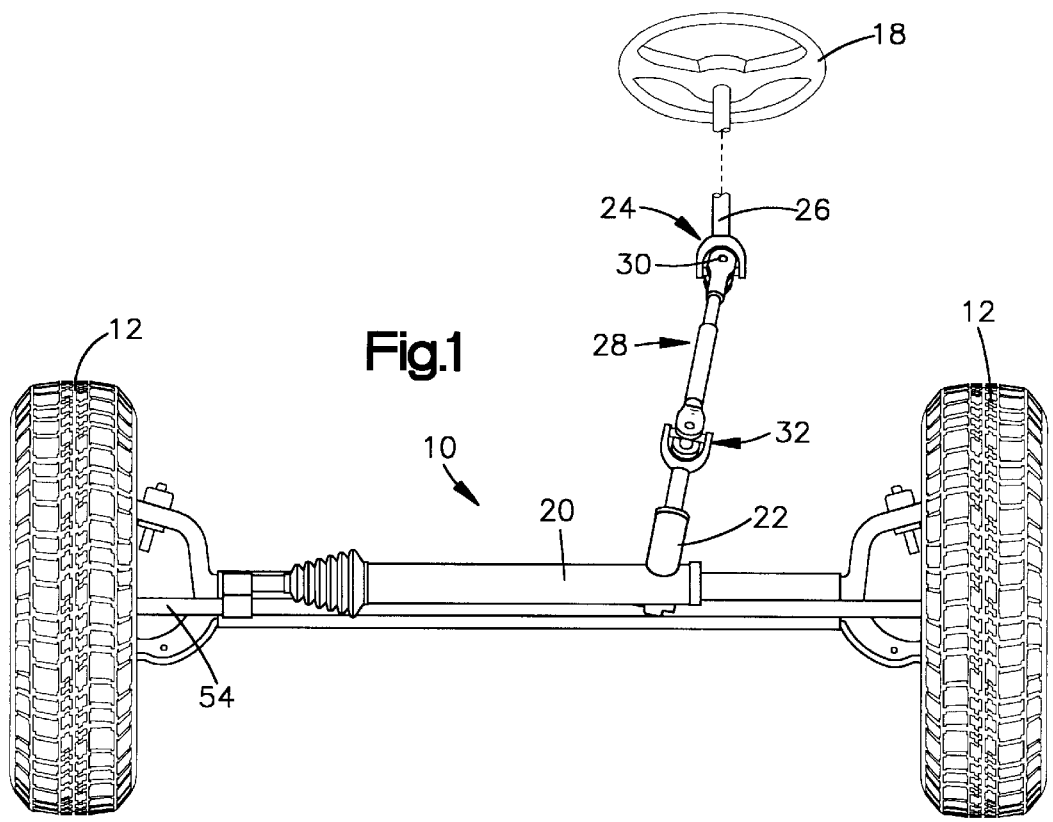
FIG. 1 is a simplified fragmentary schematic illustration of a steering apparatus which is constructed in accordance with the present invention and utilized to turn steerable vehicle wheels.

A steering apparatus 10 (FIG. 1) constructed in accordance with the present invention is utilized to turn steerable vehicle wheels 12. The steering apparatus 10 includes a steering wheel 18 which is connected with a power steering motor 20. A steering control valve 22 is actuatable to control operation of the power steering motor 20. The steering control valve 22 is connected with the steering wheel 18 by a linkage assembly 24.

The linkage assembly 24 includes rotatable shafts 26 and 28 which are connected with each other and with the steering control valve 22 by universal joints 30 and 32. The shaft 28 is of the well known variable length telescoping type which enables the distance between the universal joints 30 and 32 to be varied in a known manner during movement of the steerable vehicle wheels along an irregular surface. Depending upon the application, one or more shafts 28 could be required. In addition, bevel gear sets, slip joints and/or U-joints could be provided in the linkage assembly 24.

The power steering motor 20 (FIG. 2) includes a wall assembly 34 which defines a cylindrical main chamber 36 in which a cylindrical piston 38 is located. The piston 38 divides the main chamber 36 into a head end variable volume chamber 42 and a rod end variable volume chamber 44. A hollow cylindrical piston rod 48 is fixedly connected to the piston 38 and extends through the variable volume rod end chamber 44 and a circular opening in an end section 50 of the wall assembly 34. The outer end of the piston rod 48 is connected with a steering linkage link 54 by a ball and socket joint assembly 56.

The steering control valve 22 is actuatable to control operation of the power steering motor 20. The steering control valve 22 directs high pressure fluid from a power steering pump (not shown) to the power steering motor 20 to effect operation of power steering motor 20 and turning movement of the steerable vehicle wheels 12 toward the left or the right.

The steering control valve 22 includes a rotatable input member 72 (FIG. 2) which is connected with the steering wheel 18 (FIG. 1) by the linkage assembly 24. An inner valve member or spool 76 (FIG. 2) is fixedly connected with the input member 72 and is rotatable relative to an outer valve member or sleeve 78. The valve sleeve 78 is connected with the valve spool 76 through a torsion bar 80 and a base member 84 which is secured to one end of the torsion bar.

Upon rotation of the steering wheel 18 (FIG. 1), the linkage assembly 24 rotates the input member 72 and flexes the torsion bar 80. This results in rotation of the valve spool 76 through a short arcuate distance relative to the valve sleeve 78. The relative rotation between the valve spool 76 and the valve sleeve 78 ports high pressure fluid to one of the variable volume chambers 42 or 44 and connects the other variable volume chamber with a reservoir or drain (not shown). This effects operation of the power steering motor 20 to turn the steerable vehicle wheels in a known manner.

As the power steering motor 20 is operated, a feedback system 88 rotates the base member 84 and the valve sleeve 78 toward their initial positions relative to the valve spool 76. Once the power steering motor 20 has been operated to an extent corresponding to the extent of rotation of the steering wheel 18, the valve spool 76 and valve sleeve 78 are returned to their initial positions to interrupt operation of the steering motor. The manner in which the steering control valve 22 is constructed may be the same as shown in U.S. Pat. No. 4,475,410. However, if desired, the steering control valve 22 could be constructed in a manner similar to that disclosed in U.S. Pat. No. 3,709,099.

The feedback system 88 (FIG. 2) restores the valve spool 76 and valve sleeve 78 to their initial positions when the power steering motor 20 is operated to an extent corresponding to the extent of rotation of the input member 72. In addition, the feedback system 88 provides a direct mechanical drive if a power steering pump (not shown) is ineffective to provide high pressure fluid to the power steering motor 20.

The feedback system 88 includes a rotatable screw member 92 (FIGS. 2 and 4) which is provided with an external thread convolution 98 which is engaged by a recirculating ball nut 100 in the piston 38. Due to the interaction between the recirculating ball nut 100 and the external thread convolution 98, axial movement of the piston 38 causes the screw member 92 to be rotated to an extent which varies as a function of the extent of movement of the piston relative to the wall assembly 34. Bevel gears 104 and 105 (FIG. 2) in the feedback system 88 transmit rotary motion of the screw member 92 to the valve sleeve 78. This results in the valve sleeve 78 being rotated relative to the valve spool 76 to an extent which corresponds to the extent of axial movement of the piston 38. The screw member 92, bevel gears 104 and 105, and steering control valve 22 cooperate in the same general manner as is disclosed in U.S. Pat. No. 3,918,544 and in U.S. Pat. No. 4,418,781. It should be understood that the present invention could be used with other types of power steering systems, such as rack and pinion, integral gear, and electric systems.

Lash Take-Up

In accordance with a feature of the present invention, lash in the linkage assembly 24 and feedback system 88 is taken up by urging the linkage assembly to rotate in a first direction and urging the power steering motor 20 to rotate the linkage assembly in a second direction opposite to the first direction. Lash is relative movement between components of the steering apparatus 10 as a result of clearance between the components of the steering apparatus. This clearance may be the result of manufacturing tolerances, wear and/or other causes.

The steering apparatus 10 of the present invention eliminates the effects of lash when the vehicle is proceeding straight ahead. The steering apparatus 10 also eliminates the effects of lash during turning of the steerable vehicle wheels 12 in a first direction from a straight ahead condition. However, during turning of the steerable vehicle wheels 12 in a second direction from the straight ahead condition, the vehicle wheels act as springs which oppose turning movement of the vehicle wheels. The combined effect of the steerable vehicle wheels 12 and steering apparatus 10 may result in rotation of the steering wheel 18 without a corresponding turning movement of the steerable vehicle wheels 12 in the second direction.

When the steering wheel 18 is in an initial condition in which the vehicle is moving straight ahead, there is no relative movement between components of the linkage assembly 24 (FIG. 1) and feedback system 88 (FIG. 2) due to clearance or play (lash) between movable parts of the linkage assembly and feedback system. Upon rotation of the steering wheel 18 in a first direction from the initial condition in which the vehicle is moving straight ahead, there is no relative movement between components of the linkage assembly 24 and feedback system 88 due to clearance or play (lash) between adjacent movable parts of the linkage assembly and feedback system. However, during rotation of the steering wheel 18 in a second direction from an initial condition in which the vehicle is moving straight ahead, there may be relative movement between components of the linkage assembly 24 and feedback system 88 due to the resilient nature of the steerable vehicle wheels 12 and the clearance or play (lash) between adjacent movable parts of the linkage assembly and feedback system after there has been some turning movement of the steering wheel.

When the steering wheel 18 i s rotated in the second direction from the initial condition, the clearance or play between the movable parts of the linkage assembly 24 and feedback system 88 is taken up by rotation of the steering wheel after the steering wheel has been rotated away from an initial position. The clearance or play between adjacent movable parts of the linkage assembly 24 and feedback system 88 is compensated for by slight rotation of the steering wheel 18 without a corresponding turning movement of the steerable vehicle wheels 12 after the steering wheel has been rotated in the second direction through a distance sufficient to initiate turning movement of the steerable vehicle wheels. Although a slight rotation of the steering wheel 18 to take up lash when the vehicle is proceeding straight ahead is objectionable, the same s light rotation to take up lash is not noticeable during turning of the steerable vehicle wheels 12.

Movement of the steering wheel 18 without turning movement of the steerable vehicle wheels 12 due to lash in the steering linkage 24 and/or feedback system 88 is objectionable when the vehicle is proceeding straight ahead. This is because an operator of the vehicle will feel that the vehicle is tending to wander along a road if the clearance between adjacent movable parts of the linkage assembly 24 and feedback system 88 is present when the vehicle is proceeding straight ahead. However, after turning movement of the steerable vehicle wheels 12 has been initiated, the slight rotation of the steering wheel 18 without corresponding turning movement of the steerable vehicle wheels due to lash in the linkage assembly 24 and/or feedback system 88 is not noticed by the operator of the vehicle.

Figure 3:
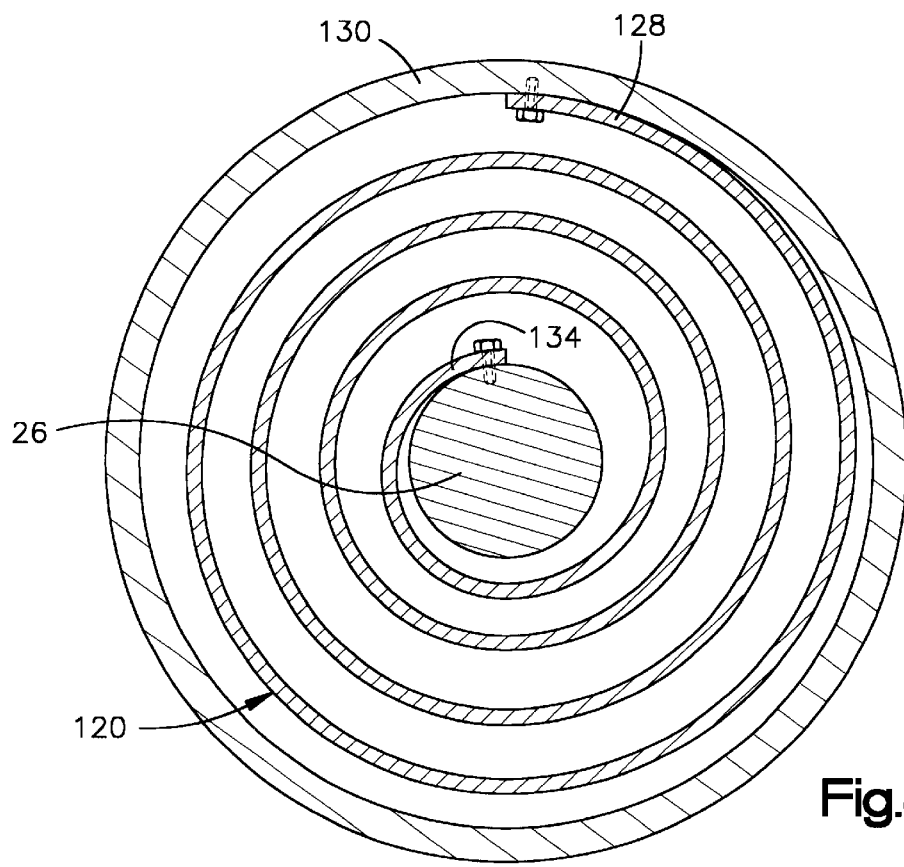
FIG. 3 (on sheet 1 of the drawings) is a simplified schematic sectional view illustrating the manner in which a spring is connected with a steering shaft at a location adjacent to a steering wheel in the steering apparatus of FIG. 1.

In the illustrated embodiment of the invention, the shaft 26 in the linkage assembly 24 (FIG. 1) is urged to rotate in one direction, for example, a counterclockwise direction as viewed in FIG. 3, by a first spring 120. The piston 38 in the power steering motor 20 is pressed toward the left (as viewed in FIGS. 2 and 4) by a second spring 124. Although it is preferred to use springs 120 and 124 to provide biasing forces which take up lash, other known devices could be utilized to provide the biasing forces if desired. Although the springs 120 and 124 are directly connected with the steering shaft 26 and power steering motor 20, the springs could be indirectly connected with the steering shaft and power steering motor if desired.

The biasing force applied by the spring 124 against the piston 38 causes the feedback system 88 (FIG. 2) to urge the shaft 26 to rotate in a clockwise direction (as viewed in FIG. 3). Thus, the spring 124 in the power steering motor 20 urges the shaft 26 to rotate in a direction opposite to the direction which the shaft is urged to rotate by the spring 120. Since the feedback system 88 (FIG. 2) and linkage assembly 24 (FIG. 1) are biased in one direction by the spring 120 and are biased in the opposite direction by the spring 124, lash, that is, clearance or play between adjacent movable parts of the feedback system 88 and linkage assembly 24, is taken up.

Steering Linkage Biasing Spring

The spring 120 (FIG. 3) is a spiral coiled spring having a rectangular cross section. An outer end portion 128 of the spring 120 (FIG. 3) is fixedly connected to a stationary cylindrical housing 130 which partially encloses the shaft 26. An inner end portion 134 of the spring 120 is fixedly connected to the shaft 26. Although one specific type of spring, that is a spiral coiled spring, is utilized as the spring 120, other known types of springs could be utilized if desired. If desired, a plurality of springs could be used in place of the single spring 120.

The counterclockwise biasing force applied against the shaft 26 by the spring 120 is effective to eliminate clearance between components of the universal joints 30 and 32 and components of the shaft 28 in the linkage assembly 24 (FIG. 1). Although only a single variable length shaft 28 has been illustrated in FIG. 1, a plurality of variable length shafts could be provided in the linkage assembly 24. Of course, if additional variable length shafts 28 are provided in the linkage assembly 24, additional joint assemblies would also be provided to interconnect the shafts.

The counterclockwise rotational force applied against the shaft 26 by the spring 120 (FIG. 3) is transmitted from the linkage assembly 24 to the input member 72 (FIG. 2) of the steering control valve 22. This force is transmitted through the torsion bar 80 to the base member 84 in the steering control valve 22. The force transmitted to the base member 84 in the steering control valve 22 presses the teeth on the bevel gear 104 firmly against teeth on the bevel gear 105 to eliminate clearance or play, that is, lash, between the teeth on the bevel gears 104 and 105 in the feedback system 88.

Figure 4:
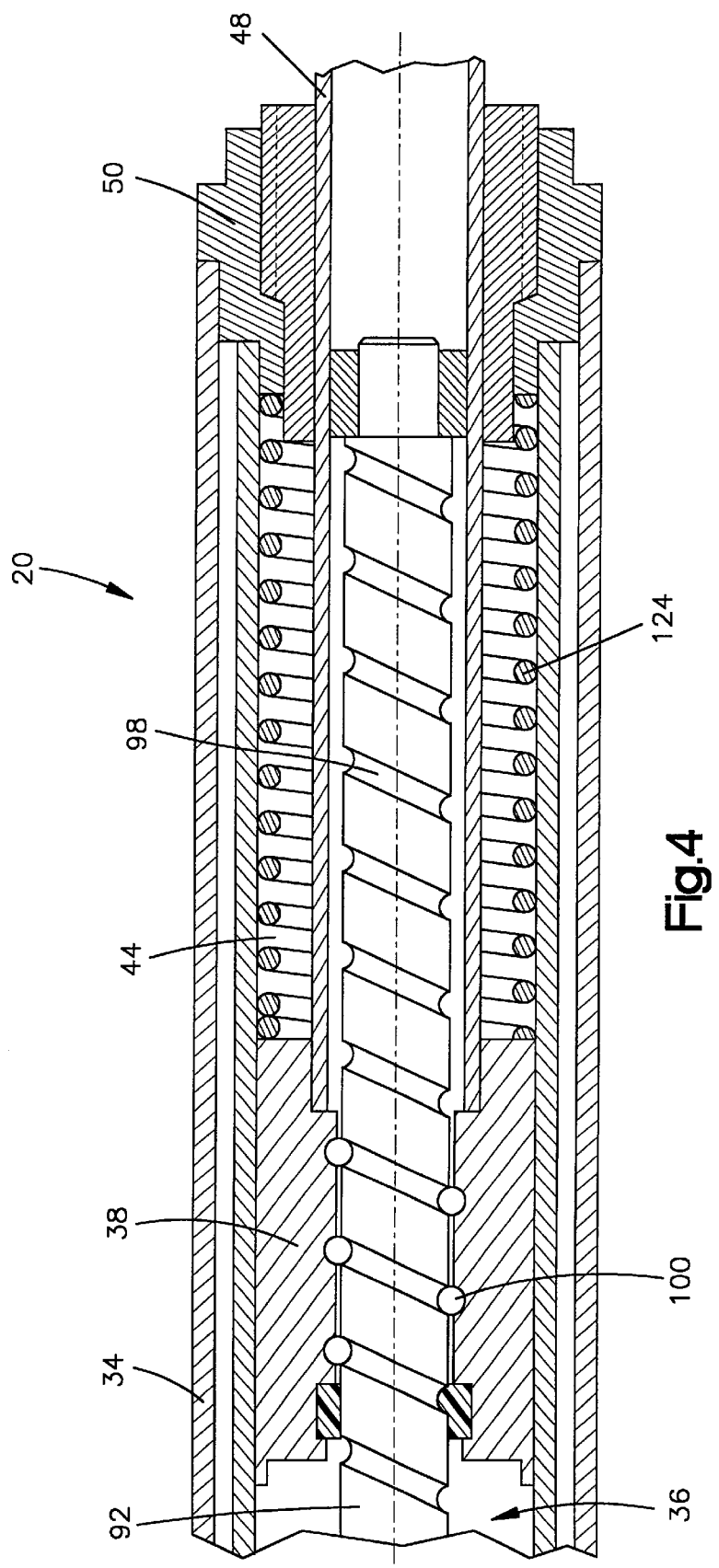
FIG. 4 (on sheet 3 of the drawings) is an enlarged simplified fragmentary sectional view of a portion of the power steering motor of FIG. 2 and illustrating the relationship between a spring and components of the power steering motor.

Biasing force is transmitted from the bevel gear 105 to the screw member 92. The force applied to the screw member 92 by the bevel gear 105 is applied against the ball nut 100 (FIG. 4) in the piston 38. The application of force to the ball nut 100 in the piston 38 by the screw member 92 eliminates clearance between recirculating ball elements in the ball nut and the external thread convolution 98 on the screw member 92. This force is transmitted from the piston 38 to the spring 124 (FIG. 4).

Steering Motor Biasing Spring

It should be understood that a biasing force is also transmitted from the spring 124 through the piston 38 to the feedback system 88. The biasing force from the spring 124 is transmitted from the feedback system 88 through the steering control valve 22 to the linkage assembly 24. The force transmitted from the spring 124 is applied against the spring 120 by the linkage assembly 24.

The spring 124 (FIG. 4) is a helical coil spring having a circular cross sectional configuration. The spring 124 applies a biasing force against the piston 38 urging the piston toward the left (as viewed in FIG. 4). Since there is no spring in the head end chamber 42, the biasing force applied against the piston 38 by the spring 124 is transmitted through the ball nut 100 to the screw member 92. It should be understood that the spring 124 could be disposed in the head end chamber 42 and no spring provided in the rod end chamber 44 if desired. Although one specific type of spring, that is, a helical coil spring, is utilized as the spring 124, other known types of springs could be utilized if desired. If desired, a plurality of springs could be used in place of the single spring 124.

Figure 2:
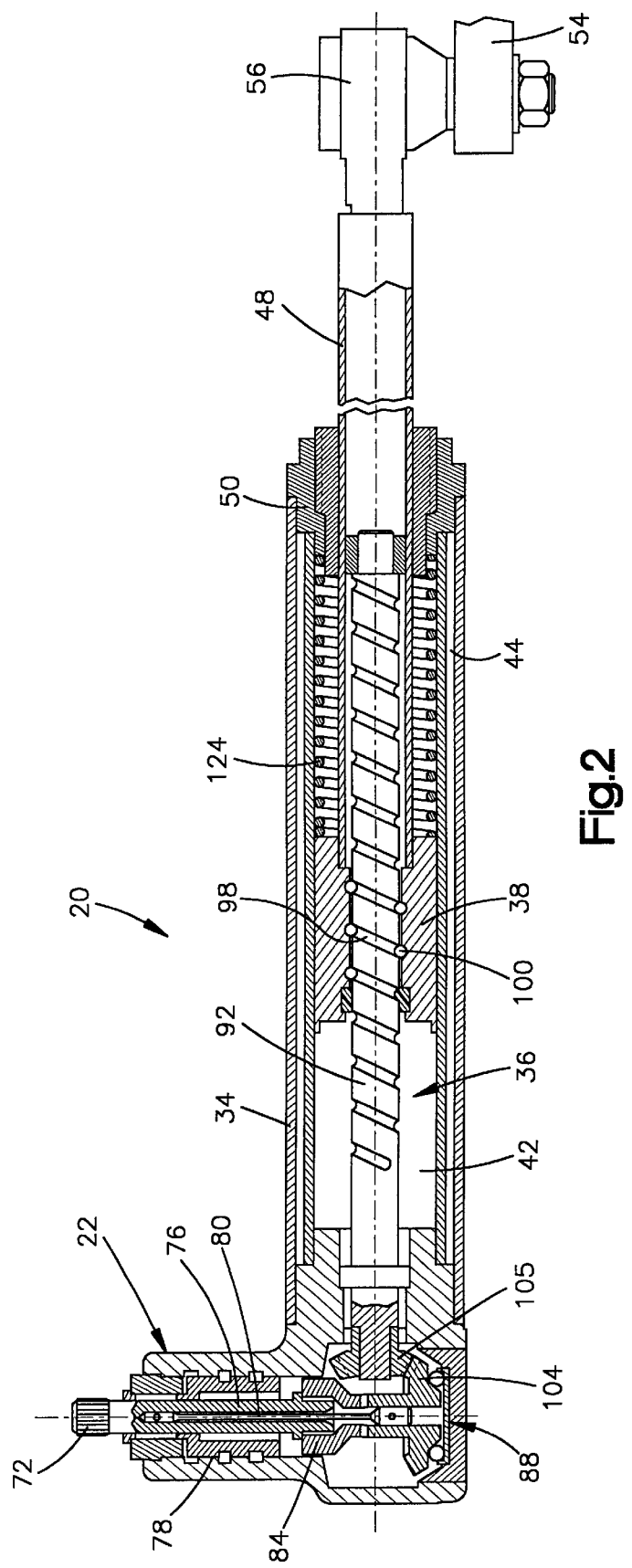
FIG. 2 is a fragmentary schematic sectional view illustrating the construction of a power steering motor in the steering apparatus of FIG. 1.

The screw member 92 transmits the biasing force to the bevel gear 105 (FIG. 2). The biasing force is transmitted from the bevel gear 105 to the bevel gear 104 and base member 84 in the steering control valve 22. The biasing force is transmitted from the base member 84 through the torsion bar 80 to the input member 72 of the valve assembly 22.

The biasing force from the spring 124 in the power steering motor 20 is transmitted from the steering control valve input member 72 to the linkage assembly 24 (FIG. 1). The biasing force is transmitted through the linkage assembly 24 to the steering shaft 26. The biasing force urges the steering shaft 26 to rotate in a clockwise direction, as viewed in FIG. 3. The biasing force is transmitted from the steering shaft 26 to the spring 120.

The force transmitted between the two springs 120 (FIG. 3) and 124 (FIG. 4) is effective to take up lash between components of the steering apparatus 10. Although it is preferred to use the springs 120 and 124 to apply force to the steering apparatus 10 to take up lash, other known devices could be utilized to take up the lash if desired. For example, an electric motor could be substituted for the spring 120 to apply a biasing force to the shaft 26. Either in addition or alternatively, fluid pressure bias at the power steering motor 20 could be substituted for the spring 124. Although the spring 124 is a cylindrical helical spring of circular cross section and the spring 120 is a spiral coiled spring of rectangular cross section, other known types of springs could be utilized for the springs 120 and 124 if desired. For example, a torsional spring could be used.

When the vehicle is proceeding straight ahead, the opposing forces applied to the steering apparatus 10 by the springs 120 and 124 are effective to take up clearance between components of the steering apparatus. Therefore, a small increment of movement of the steering wheel 18 in either direction results in a corresponding turning movement of the steerable vehicle wheels 12. This minimizes any tendency for the vehicle to wander from a straight ahead condition.

Upon turning of the steering wheel 18 in one direction, the biasing force applied by one of the springs 120 or 124 increases while the biasing force applied by the other spring decreases. It is presently preferred to have both of the springs 120 and 124 effective to apply biasing force to the linkage assembly 24 throughout the range of turning movement of the steerable vehicle wheels 12. However, the steerable vehicle wheels 12, themselves, function as springs which oppose movement of the steerable vehicle wheels.

The force applied by the steerable vehicle wheels 12 during turning movement of the steerable vehicle wheels in a first direction adds to the combined force applied to components of the linkage assembly 24 by the spring 124. However, during turning movement of the steerable vehicle wheels 12 in a second direction, opposite to the first direction, the force applied by the steerable vehicle wheels subtracts from the combined force applied to components of the linkage assembly by the spring 124. Depending on the actual stiffness of the vehicle wheels 12, the force produced by this spring stiffness could exactly offset the force produced by the spring 124. At this point, the torque applied to the steering wheel 18 is equal to the torque produced by spring 120, lash is then apparent in the system. This may result in rotation of the steering wheel 18 to turn the steerable vehicle wheels 12 in the second direction without a corresponding turning movement of the steerable vehicle wheels after the steering wheel has been rotated through a portion of its range of movement during turning of the steerable vehicle wheels in the second direction.

When the steering wheel 18 is manually rotated in a counterclockwise direction, torque applied to the steering wheel is in the same direction as the force applied to the steering shaft 26 by the spring 120. The biasing force applied by the spring 120 urges the steering shaft 26 and steering wheel 18 in a counterclockwise direction away from their initial (straight ahead) condition. As the counterclockwise steering wheel rotation increases, the assist of the spring 120 to movement in the counterclockwise direction decreases. At the same time, the piston 38 is moving toward the right (as viewed in FIG. 2) and opposition provided by the spring 124 to rotation of the steering wheel 18 in the counterclockwise direction increases.

The springs 120 and 124 are both effective to apply oppositely directed biasing forces to the linkage assembly 24 throughout the range of rotation of the steering wheel 18 in a counterclockwise direction. However, the force applied by the spring 124 will be greater than the initial (straight ahead) force applied by the spring 124 when the steering wheel 18 has been rotated counterclockwise from its initial position. Conversely, the force applied by the spring 120 will be less than the initial (straight ahead) force applied by the spring 120 when the steering wheel 18 has been rotated counterclockwise from its initial position.

When the steering wheel is manually rotated in a clockwise direction, torque applied to the steering wheel is in the opposite direction to force applied to the steering wheel 26 by the spring 120. As the clockwise steering wheel rotation increases, the opposition of the spring 120 to movement in the clockwise direction increases. At the same time, the piston 38 is moving toward the left (as viewed in FIG. 2) and assist provided by the spring 124 to rotation of the steering wheel in the clockwise direction decreases.

The springs 120 and 124 are both effective to apply oppositely directed biasing forces to the linkage assembly 24 throughout the range of rotation of the steering wheel 18 in a clockwise direction. However, the force applied by the spring 124 will be less than the initial (straight ahead) force applied by the spring 124 when the steering wheel 18 has been rotated clockwise from its initial position. Conversely, the force applied by the spring 120 will be greater than the initial (straight ahead) force applied by the spring 120 when the steering wheel 18 has been rotated clockwise from its initial condition.

Regardless of which direction the steering wheel 18 is rotated, the steerable vehicle wheels 12 act as springs which resist turning movement. When the steering wheel 18 is being rotated counterclockwise the piston 38 is moving toward the right (as viewed in FIG. 2), force transmitted from the steerable vehicle wheels 12 to the piston is acting toward the left (as viewed in FIG. 2). This leftward reaction force is in the same direction as the force applied by the spring 124 to the piston 38. Therefore, the force transmitted from the steerable vehicle wheels 12 to the piston 38 adds to the force applied against the piston by the spring 124 during counterclockwise rotation of the steering wheel.

When the steering wheel 18 is being rotated clockwise and the piston 38 is moving toward the left (as viewed in FIG. 2), force transmitted from the steerable vehicle wheels 12 to the piston is acting toward the right (as viewed in FIG. 2). This rightward reaction force is in the opposite direction of the force applied by the spring 124 to the piston 38. Therefore, the force transmitted from the steerable vehicle wheels 12 to the piston 38 subtracts from the force applied against the piston by the spring 124 during clockwise rotation of the steering wheel 18.

When the rightward (as viewed in FIG. 2) reaction force transmitted from the vehicle wheels 12 to the piston 38 equals the leftward (as viewed in FIG. 2) force of the spring 124, the components of the linkage assembly 24 are no longer pressed together by the springs 120 and 124. At this point the torque input to the steering wheel 18 equals the torque generated by the spring 120, and the force generated by spring 124 equals the force produced by the stiffness of the wheels 12. Therefore, there is no effective force produced by spring 124 and opposed by spring 120 which will force the lash producing elements together. For this specific level of torque input to the steering wheel 18, lash will be present. This enables components of the linkage assembly 24 to move relative to each other due to lash. As this occurs, there is rotation of the steering wheel 18 without corresponding turning movement of the steerable vehicle wheels. However, rotation of the steering wheel 18 without corresponding turning movement of the steerable vehicle wheels 12 occurs during clockwise rotation of the steering wheel 18 and is not objectionable to an operator of the vehicle.

The foregoing description has set forth the forces of the springs 120 and 124 as being balanced by reaction forces from the steerable vehicles wheels 12 during clockwise rotation from a torque applied to steering wheel 18. It should be understood that the steering apparatus 10 could be constructed so that the forces of the springs 120 and 124 are balanced by reaction forces from the steerable vehicle wheels 12 during counterclockwise rotation of the steering wheel 18. It should also be understood that the present invention is not to be limited to use with any particular type of steering apparatus or vehicle.

It is contemplated that it may be desired to adjust the force applied by the spring 120 (FIG. 3) against the shaft 26. It is contemplated that this could be done by connecting the outer end portion 128 of the spring 120 with a sleeve which is rotatable relative to the housing 130. A screw mechanism may be connected with the sleeve to rotate the sleeve relative to the housing 130. By rotating the sleeve to move the end portion 128 of the spring in a counterclockwise direction (as viewed in FIG. 3), the force applied by the spring against the shaft 26 would be increased. Similarly, by operating the screw mechanism to rotate the sleeve in a clockwise direction (as viewed in FIG. 3), the force applied by the spring 120 against the shaft 26 would be decreased.

In the illustrated embodiment of the invention, the spring 124 is disposed in the power steering motor 20. However, the spring 124 could be connected with the power steering motor 20 through steering linkage components which connect the power steering motor with the steerable vehicle wheels 12. For example, a spring corresponding to the spring 124 could be connected with the kingpin in the steering linkage which connects the power steering motor 20 with the steerable vehicle wheels 12. If this is done, the spring connected with the kingpin could be a torsional spring or a spiral coil spring. Regardless of where the spring 124 is located and how the spring is connected with the power steering motor 20, the spring 124 will be effective to urge the power steering motor in a direction opposing the spring 120.

From the above description of the invention, those skilled in the art will perceive improvements, changes and modifications. Such improvements, changes and modifications within the skill of the art are intended to be covered by the appended claims.

Having described the invention, the following is claimed:

1. An apparatus for use in turning steerable vehicle wheels, said apparatus comprising:

a steering wheel which is manually rotatable from an initial condition to an actuated condition;

a power steering motor which is connected with said steering wheel and is operable from an unactuated condition to an actuated condition in response to rotation of said steering wheel;

a first spring which is connected with said steering wheel and urges said steering wheel in one direction; and a second spring which is connected with said power steering motor and urges said power steering motor in a direction opposing said first spring.

2. An apparatus as set forth in claim 1 further including a linkage connected with said steering wheel and with said power steering motor, said linkage including a plurality of joints, said first and second springs cooperating with said linkage to take up lash in said joints when said steering wheel is in the initial condition and said power steering motor is in the unactuated condition.

3. An apparatus as set forth in claim 1 further including first and second gears disposed in meshing engagement with each other and connected with said steering wheel and said power steering motor, said first and second springs cooperating with said first and second gears to take up lash between said first and second gears when said steering wheel is in the initial condition and said power steering motor is in the unactuated condition.

4. An apparatus as set forth in claim 1 further including a ball nut and screw disposed in engagement with each other and connected with said steering wheel and power steering motor, said first and second springs cooperating with each other to take up lash between said ball nut and screw when said steering wheel is in the initial condition and said power steering motor is in the unactuated condition.

5. An apparatus as set forth in claim 1 further including a rotatable member connected with said steering wheel, said first spring being effective to urge said rotatable member to rotate in a first direction, said second spring being effective to urge said rotatable member to rotate in a second direction opposite to the first direction.

6. An apparatus as set forth in claim 1 wherein said power steering motor includes a piston disposed in and movable relative to a cylinder, said first spring being effective to urge said piston to move in a first direction relative to said cylinder, said second spring being effective to urge said piston to move in a second direction relative to said cylinder.

7. An apparatus as set forth in claim 1 wherein said steering wheel is connected with said power steering motor by a linkage which includes a plurality of components having lash between said plurality of components, said first and second springs being effective to press said plurality of components against each other to take up lash between said plurality of components when said steering wheel is in the initial condition.

8. An apparatus as set forth in claim 7 wherein said first and second springs are ineffective to press said plurality of components against each other when said steering wheel is in an actuated condition.

9. An apparatus for use in turning steerable vehicle wheels, said apparatus comprising:

a power steering motor which is operable from an inactive condition to an active condition to effect turning of the steerable vehicle wheels;

a steering wheel which is manually rotatable to effect operation of said power steering motor between the active and inactive conditions;

a force transmitting apparatus interconnecting said power steering motor and said steering wheel;

a first device connected with said force transmitting apparatus adjacent to said steering wheel, said first device being effective to urge a rotatable member in said force transmitting apparatus to rotate in a first direction; and a second device connected with said power steering motor, said second device being effective to cause said power steering motor to urge said rotatable member in said force transmitting apparatus to rotate in a second direction opposite to said first direction when said power steering motor is in the inactive condition.

10. An apparatus as set forth in claim 9 wherein said first device is a first spring which is connected with said rotatable member, said second device is a second spring which is effective to urge a first portion of said power steering motor to move relative to a second portion of said power steering motor.

11. An apparatus as set forth in claim 9 wherein said force transmitting apparatus includes a plurality of joints having lash between components of the joints, said first and second devices being effective to press components of said joints together to take up lash between the components of said joints.

* * * * *